United States Patent [19]

Hsieh et al.

[11] 4,000,084

[45] Dec. 28, 1976

[54] LIQUID CRYSTAL MIXTURES FOR ELECTRO-OPTICAL DISPLAY DEVICES

[75] Inventors: Paul Y. Hsieh, Irvine; Yat-Shir Lee, Costa Mesa; John E. Jensen, Santa Monica, all of Calif.

[73] Assignee: Hughes Aircraft Company, Culver City, Calif.

[22] Filed: Dec. 17, 1973

[21] Appl. No.: 425,454

[52] U.S. Cl. .................. 252/299; 350/160 LC
[51] Int. Cl.$^2$ .................. C09K 3/34; G02F 1/13
[58] Field of Search .................. 252/299, 408 LC; 350/160 LC

[56] References Cited

UNITED STATES PATENTS

| | | | |
|---|---|---|---|
| 3,795,436 | 3/1974 | Boller et al. | 252/408 |
| 3,796,479 | 3/1974 | Helfrich et al. | 252/408 |
| 3,815,972 | 6/1974 | Hsieh | 252/408 |
| 3,826,757 | 7/1974 | Wong | 252/408 |
| 3,836,478 | 9/1974 | Green et al. | 252/408 |
| 3,876,286 | 4/1975 | Deutscher et al. | 252/299 |
| 3,881,806 | 5/1975 | Suzuki | 252/299 |
| 3,915,883 | 10/1975 | Van Meter et al. | 252/299 |
| 3,919,105 | 11/1975 | Katagiri et al. | 252/299 |
| 3,923,857 | 12/1975 | Boller et al. | 252/299 |
| 3,960,752 | 6/1976 | Klanderman et al. | 252/299 |

FOREIGN PATENTS OR APPLICATIONS

| | | | |
|---|---|---|---|
| 2,415,929 | 10/1974 | Germany | 252/299 |
| 2,306,739 | 8/1973 | Germany | 252/299 |
| 2,321,632 | 11/1974 | Germany | 252/299 |
| 2,327,036 | 12/1973 | Germany | 252/299 |
| 2,139,628 | 2/1973 | Germany | 252/299 |
| 2,024,269 | 12/1971 | Germany | 252/299 |
| 49-34,488 | 3/1974 | Japan | 252/299 |
| 49-88,791 | 8/1974 | Japan | 252/299 |

*Primary Examiner*—Benjamin R. Padgett
*Assistant Examiner*—T. S. Gron
*Attorney, Agent, or Firm*—John A. Sarjeant; W. H. MacAllister; Booker T. Hogan, Jr.

[57] ABSTRACT

This invention is directed to liquid crystal mixtures which have an extended operating range and require a low operating voltage. They are white in color and stable to atmospheric oxygen, moisture, and light. Because of their superior properties, they are useful in electro-optical displays, especially in liquid crystal watches and pocket-size calculators.

11 Claims, No Drawings

LIQUID CRYSTAL MIXTURES FOR ELECTRO-OPTICAL DISPLAY DEVICES

BACKGROUND OF THE INVENTION

There has been extensive interest in liquid crystal optical displays in the last several years and particularly in liquid crystal watches and pocket-size calculators. The interest of the scientific community has been indicated in literature articles such as *Applied Physics Letters*, 18, No. 4, Feb. 15, 1971, and *Proceedings of IEEE*, August 1972. An article in the October 1973 issue of Fortune, i.e., "What Makes Liquid Crystals Shine," page 194 et seq., establishes that the technology is no longer a mere laboratory curiosity but has now expanded into the business world.

Although considerable progress has been made in the development of liquid crystal displays, they have all suffered to some extent because of restrictions imposed by the liquid crystal mixture. In particular, the stability, operating temperature range, and operating voltage have been unsatisfactory.

THE INVENTION

We have discovered liquid crystal mixtures which overcome to a surprising degree the problems of the prior art mixtures. The compositions fall into two groups. The first group consists essentially of (1) p-cyanophenyl-p-n-alkyl benzoate, and, (2) as a solvent, p-n-alkylphenyl-p-n-alkylbenzoate. In the second group, p-n-alkylphenyl-p-(p-n-alkylbenzoyloxy) benzoate having the formula:

is added to a composition from the first group to extend the operating range. The alkyl radicals in the compounds may have from 1 to about 8 carbon atoms. We have made compositions of the first group which function as nematic liquid crystals from about −20° C to about 35° C. Our preferred composition from the second group functions from about −50° C to about 70° C and has an operating voltage of 3.2 volts (peak to peak, 60 Hz, square wave). This voltage is low enough that the display can be driven by two commercially available batteries without the need of an up-converter.

In addition, our new mixtures are superior to commercially available products in that they are white in color, and are also stable to atmospheric oxygen, moisture, and light.

The individual components of this mixture are either available commercially or may be prepared by standard chemical procedures. For instance, the p-alkylphenyl-p-alkyl benzoates and the p-cyanophenyl-p-alkyl benzoates may be prepared by esterifying the appropriate p-alkylphenol or p-cyanophenol with p-alkyl benzoyl chloride in the presence of dry pyridine. The benzoyloxy-benzoates may be prepared in a two-step process. First, p-alkylphenol is esterified with p-hydroxy benzoic acid by the method of W. W. Lawrance, Jr., *Tetrahedron Letters* 3453 (1971) to form the first ester moiety. This product is then esterified with the appropriate p-alkyl benzoyl chloride in the presence of dry pyridine to yield the diester. The latter reaction is similar to the procedure of T. S. Wheeler, *Organic Synthesis, Collected Volumes*, 4, page 478 (1963).

Eutectic mixtures of the present invention prevent phase separation (co-existence of solid and liquid crystalline phases) and consequently are preferred. Mole ratios for each eutectic mixture depends on the specific compounds in the mixture. The ratios can be determined by constructing phase diagrams of mixture systems.

Useful compositions other than eutectic mixtures can also be formulated. It is important, however, to keep the amount of cyanophenyl-alkyl benzoates and, when used, alkylphenyl-(alkylbenzoyloxy)-benzoates at a level which permits them to be dissolved in a p-n-alkyl-phenyl-p-n-alkyl benzoate, such as p-n-butylphenyl-p-toluate or p-n-butylphenyl-p-n-butylbenzoate.

In general, the quality of a field effect liquid crystal system depends to a large extent on the physical properties as well as the molecular structure of the individual components. For example, as the chain length of the terminal alkyl of compound (1) increases, there is a rise in the nematic to isotropic point and an increase in the time of response to applied electrical fields. In order to optimize these properties, we prefer to use two or more members from compound (1).

In the liquid crystal compositions of the present invention, the benzoyloxy-benzoate component is used to improve the time of response of the mixture and extend the operating temperature range. It accomplishes this without resulting in any destructive influence of the liquid crystalinity of the system.

We have used liquid crystal mixtures of the present invention in electronic watches under test conditions for nine months. During that time, displays fabricated from our liquid crystal systems showed no deterioration. This was confirmed from observations with a polarizing microscope and DTA under the following conditions:

1. Constant driving by a 3V power source without an up-converter in a watch module, at room temperature for 9 months,
2. Exposure to direct sunlight for 3 weeks,
3. Exposure to a strong UV light whose intensity was 1000 times stronger than sunlight for 15 minutes,
4. Cycling between −20° to 100° C at 90% RH for 24 hours, and
5. Storage at 80° C for 2 hours.

During this experimental period, we have also noted additional advantages in using our liquid crystal systems in electronic watches. These advantages include:

1. The contrast of a ½ mil display cell containing the present systems was better than 50 to 1 when viewed between two sheets of linear polarizers, in which the back surface of the inner polarizing sheet is coated with silver,
2. The threshold and full-on voltage were 0.9 and 1.6 volts peak-to-peak respectively when 60 Hz square wave was used for addressing, and,
3. The rise time and decay time in response to electrical signals were 200 and 300 msec.

The following examples are illustrative.

EXAMPLE I

A mixture of p-cyanophenyl-p-n-butyl benzoate (I) p-cyanophenyl-p-n-heptyl benzoate (II) and p-n-butyl-phenyl-p-toluate (III) in a molar ratio of 1:2:1 has a nematic range from −20° C to 36° C. The phase transition temperatures of compounds, I, II, and III, and a mixture of them, determined from DTA, are:

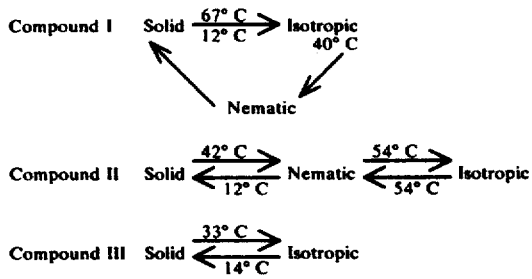

A mixture of I, II, and III at a 1:2:1 molar ratio

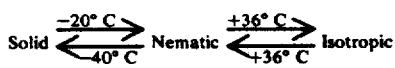

Threshold voltage 1.6 Vp-p and saturation voltage 3Vp-p (60 Hz square wave) were observed for the mixture.

EXAMPLE II

A mixture of p-cyanophenyl-p-n-butyl benzoate, p-cyanophenyl-p-n-heptyl benzoate, and p-n-butylphenyl-p-toluate in a molar ratio of 2:2:3 has a nematic range in the particularly low temperature order from −55° to 21° C.

EXAMPLE III

A mixture of p-cyanophenyl-p-n-butylbenzoate, p-cyanophenyl-p-n-heptyl benzoate, p-n-butylphenyl-p-toluate, and p-n-butylphenyl-p-(p-n-butylbenzoyloxy)-p-benzoate in a molar ratio of 2:2:2:1 has a nematic range from 10° to 54° C and fast response to an electric field.

EXAMPLE IV

A mixture of p-cyanophenyl-p-n-butylbenzoate, p-cyanophenyl-p-n-heptyl benzoate, p-n-butylphenyl-p-toluate, and p-n-butylphenyl-p-(p-n-butylbenzoyloxy)-benzoate in a molar ratio of 4:4:1:2 is a eutectic mixture. It was determined by constructing phase diagrams of mixture systems. This system has a nematic range from −50° to 71° C.

What is claimed is:

1. A mixture having nematic liquid crystal properties consisting essentially of (a) at least two nematic p-cyanophenyl-p-n-alkyl benzoates dissolved in (b) a p-n-alkylphenyl-p-n-alkylbenzoate wherein each alkyl has from 1 to about 8 carbon atoms.

2. A mixture of claim 1 wherein (a) is a mixture of p-cyanophenyl-p-n-butyl benzoate and p-cyanophenyl-p-n-heptyl benzoate.

3. A mixture of claim 2 wherein (b) is p-n-butylphenyl-p-toluate.

4. A eutectic mixture of claim 2.

5. A eutectic mixture of claim 3.

6. A mixture having nematic liquid crystal properties consisting essentially of (a) at least two nematic p-cyanophenyl-p-n-alkyl benzoates, and (c) a p-n-alkylphenyl-p-(p-n-alkylbenzoyloxy)-benzoate dissolved in (b) a p-n-alkylphenyl-p-n-alkylbenzoate wherein each alkyl has from 1 to about 8 carbon atoms.

7. A mixture of claim 6 wherein (a) is a mixture of p-cyanophenyl-p-n-butyl benzoate and p-cyanophenyl-p-n-heptyl benzoate.

8. A mixture of claim 7 wherein (b) is p-n-butylphenyl-p-toluate.

9. A mixture of claim 8 wherein (c) is p-n-butylphenyl-p-(p-n-butylbenzoyloxy)-benzoate.

10. A eutectic mixture of claim 7.

11. A eutectic mixture of claim 9.

* * * * *